(12) United States Patent
Willerth et al.

(10) Patent No.: US 11,378,716 B2
(45) Date of Patent: Jul. 5, 2022

(54) METHOD FOR ALTERING LOCATIONS OF SURVEY MEASUREMENTS ALONG A BOREHOLE SO AS TO INCREASE MEASUREMENT DENSITY

(71) Applicant: Scientific Drilling International, Inc., Houston, TX (US)

(72) Inventors: Marc Willerth, San Luis Obispo, CA (US); Benjamin C. Hawkinson, Paso Robles, CA (US); Brian D. Gleason, Atascadero, CA (US)

(73) Assignee: SCIENTIFIC DRILLING INTERNATIONAL, INC., Houston, TX (US)

( * ) Notice: Subject to any disclaimer, the term of this patent is extended or adjusted under 35 U.S.C. 154(b) by 0 days.

(21) Appl. No.: 16/774,888

(22) Filed: Jan. 28, 2020

(65) Prior Publication Data
US 2020/0166669 A1    May 28, 2020

Related U.S. Application Data

(63) Continuation of application No. 15/476,107, filed on Mar. 31, 2017, now Pat. No. 10,591,636.
(Continued)

(51) Int. Cl.
*G01V 11/00* (2006.01)
*E21B 47/024* (2006.01)

(52) U.S. Cl.
CPC .......... *G01V 11/002* (2013.01); *E21B 47/024* (2013.01)

(58) Field of Classification Search
CPC .................................. E21B 7/20; E21B 7/205
See application file for complete search history.

(56) References Cited

U.S. PATENT DOCUMENTS

| 5,107,705 A * | 4/1992 | Wraight | E21B 45/00 |
| | | | 73/152.03 |
| 6,529,834 B1 * | 3/2003 | Estes | G01C 19/38 |
| | | | 702/9 |

(Continued)

*Primary Examiner* — Tran M. Tran
(74) *Attorney, Agent, or Firm* — Ewing & Jones, PLLC

(57) ABSTRACT

A method may include providing a drill string including a measurement tool. The drill string may be positioned in a wellbore. The method may include taking a measurement with the measurement tool at a first location. The method may include coupling a pipe stand including a first selected number of tubular segments to the drill string, the first selected number being two or more. The method may include lowering or advancing the drill string into the wellbore the length of the pipe stand. The method may include taking a measurement with the measurement tool at a second location. The method may include raising the drill string the length of a tubular segment. The method may include removing a second selected number of tubular segments from the drill string, the second selected number different from the first selected number. The method may include taking a measurement with the measurement tool at a third location. The method may include raising the drill string the length of the first selected number of tubular segments. The method may include removing the first selected number of tubular segments. The method may include taking a measurement with the measurement tool at a fourth location.

16 Claims, 3 Drawing Sheets

Related U.S. Application Data

(60) Provisional application No. 62/316,411, filed on Mar. 31, 2016.

(56) References Cited

U.S. PATENT DOCUMENTS

| | | | | |
|---|---|---|---|---|
| 7,234,362 | B2* | 6/2007 | Shinn, II | G01N 33/24 |
| | | | | 73/784 |
| 7,708,057 | B2* | 5/2010 | Aivalis | E21B 23/14 |
| | | | | 166/77.2 |
| 8,016,037 | B2* | 9/2011 | Bloom | G06K 19/0723 |
| | | | | 166/255.1 |
| 8,069,932 | B2* | 12/2011 | Kamata | G01V 1/42 |
| | | | | 175/50 |
| 8,439,130 | B2* | 5/2013 | Degrange | G01V 1/46 |
| | | | | 175/40 |
| 9,157,310 | B2* | 10/2015 | Estes | E21B 47/00 |
| 9,376,908 | B2* | 6/2016 | Ludwig | E21B 47/017 |
| 9,394,751 | B2* | 7/2016 | Magnuson | G08B 21/182 |
| 9,784,041 | B2* | 10/2017 | Kinert | E21B 19/06 |
| 9,938,785 | B2* | 4/2018 | Gleitman | E21B 21/08 |
| 10,706,483 | B2* | 7/2020 | Passolt | E21B 44/00 |
| 10,782,679 | B2* | 9/2020 | Zheng | G05B 23/0283 |
| 2016/0291201 | A1* | 10/2016 | Tunc | E21B 47/04 |
| 2016/0298398 | A1* | 10/2016 | Orban | E21B 47/01 |
| 2016/0298399 | A1* | 10/2016 | Orban | E21B 23/08 |
| 2016/0298442 | A1* | 10/2016 | Orban | E21B 47/13 |
| 2016/0340987 | A1* | 11/2016 | Prammer | E21B 17/003 |
| 2017/0284183 | A1* | 10/2017 | Willerth | E21B 47/024 |
| 2020/0278193 | A1* | 9/2020 | Orban | G01B 11/14 |

* cited by examiner

METHOD FOR ALTERING LOCATIONS OF SURVEY MEASUREMENTS ALONG A BOREHOLE SO AS TO INCREASE MEASUREMENT DENSITY

CROSS-REFERENCE TO RELATED APPLICATIONS

This application is a continuation application which claims priority from U.S. utility application Ser. No. 15/476,107, filed Mar. 31, 2017, which is a nonprovisional application which claims priority from U.S. provisional application No. 62/316,411, filed Mar. 31, 2016.

TECHNICAL FIELD/FIELD OF THE DISCLOSURE

The present disclosure relates generally to downhole measurement tools, and specifically to methods of operating downhole measurement tools.

BACKGROUND OF THE DISCLOSURE

Knowledge of wellbore placement and surveying is useful for the development of subsurface oil & gas deposits, mining, and geothermal energy development. Accurate knowledge of the position of a wellbore at a measured depth, including inclination and azimuth, may be used to attain the geometric target location of, for example, an oil bearing formation of interest. Additionally, accurate relative placement of a wellbore to a geological zone or formation, or relative to one or more adjacent wellbores, may be useful for the production or hydrocarbons or geothermal energy. Additionally, knowledge of the formation properties surrounding a wellbore along its depth may be used to guide wellbore placement into desired geological features or zones. Traditionally a combination of sensors are deployed on a drill string to measure these properties.

The measurement of inclination and azimuth of the wellbore may be used in surveying operations. Inclination is the angle between the longitudinal axis of a wellbore or a drill string or other downhole tool positioned in a wellbore and the Earth's gravity vector, and azimuth is the angle between a horizontal projection of the longitudinal axis and north, whether measured by a magnetometer (magnetic north) or by a gyro (true north). In some instances, surveying operations may include estimating the distance, orientation, or both the distance and orientation of a borehole relative to other boreholes by measuring the magnetic field that is produced either passively from the adjacent wellbore's casing or drill pipe, or by measuring an actively generated magnetic field.

One method of determining the orientation and position of a downhole tool with respect to the Earth spin vector is to take a gyro survey, referred to herein as a gyrocompass, to determine a gyro toolface, inclination, and azimuth. The gyrocompass utilizes one or more gyroscopic sensors, referred to herein as gyros to detect the Earth's rotation and determine the direction to true north from the downhole tool, the reference direction for a gyro toolface and azimuth.

The determination of orientation, position, inclination, and azimuth of the downhole tool may include determining a gravity toolface or magnetic toolface by using one or more accelerometers or magnetometers respectively. Accelerometers may be used to detect the local gravity field, typically dominated by the Earth's gravity, to determine the direction to the center of the Earth. This direction may be used as the reference direction for a gravity toolface. Magnetometers may similarly be used to detect the local magnetic field, typically dominated by the Earth's magnetic field, to determine the direction to magnetic north. This direction may be used as the reference direction for a magnetic toolface.

These measurements, referred to herein as a survey, may be taken by a surveying tool positioned on a drill string. A drill string is typically made up of tubular segments joined end to end, which are built up or broken down on a drilling rig to increase or decrease respectively the overall length of the drill string during the drilling or completions process. Typically, tubular segments are joined in sections of two or three before being added to the drill string, or are removed in sets of two or three, referred to herein as a pipe stand. While the pipe stand is joined to or removed from the drill string, the drill string containing the survey or LWD tool may typically be held relatively stationary. These conditions during the joining and removal process may be ideal for making survey or logging while drilling (LWD) measurements.

SUMMARY

The present disclosure provides for a method. The method may include providing a drill string including a measurement tool. The drill string may be positioned in a wellbore. The method may include taking a measurement with the measurement tool at a first location. The method may include coupling a pipe stand including a first selected number of tubular segments to the drill string, the first selected number being two or more. The method may include lowering or advancing the drill string into the wellbore the length of the pipe stand. The method may include taking a measurement with the measurement tool at a second location. The method may include raising the drill string the length of a tubular segment. The method may include removing a second selected number of tubular segments from the drill string, the second selected number different from the first selected number. The method may include taking a measurement with the measurement tool at a third location. The method may include raising the drill string the length of the first selected number of tubular segments. The method may include removing the first selected number of tubular segments. The method may include taking a measurement with the measurement tool at a fourth location.

The present disclosure also provides for a method. The method may include providing a drill string. The drill string may include a measurement tool. The drill string may be positioned in a wellbore. The method may include taking a measurement of the wellbore with the measurement tool at a first location. The method may include removing a pipe stand including a first selected number of tubular segments from the drill string, the first selected number being two or more. The method may include raising the drill string the length of the pipe stand. The method may include taking a measurement of the wellbore with the measurement tool at a second location. The method may include adding a second selected number of tubular segments to the drill string, the second selected number different from the first selected number. The method may include lowering the drill string the length of the second selected number of tubular segments. The method may include taking a measurement of the wellbore with the measurement tool at a third location. The method may include adding a pipe stand to the drill string, the pipe stand including the first selected number of tubular segments. The method may include lowering the drill string the length of the pipe stand. The method may include taking a measurement of the wellbore with the measurement tool at a fourth location.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
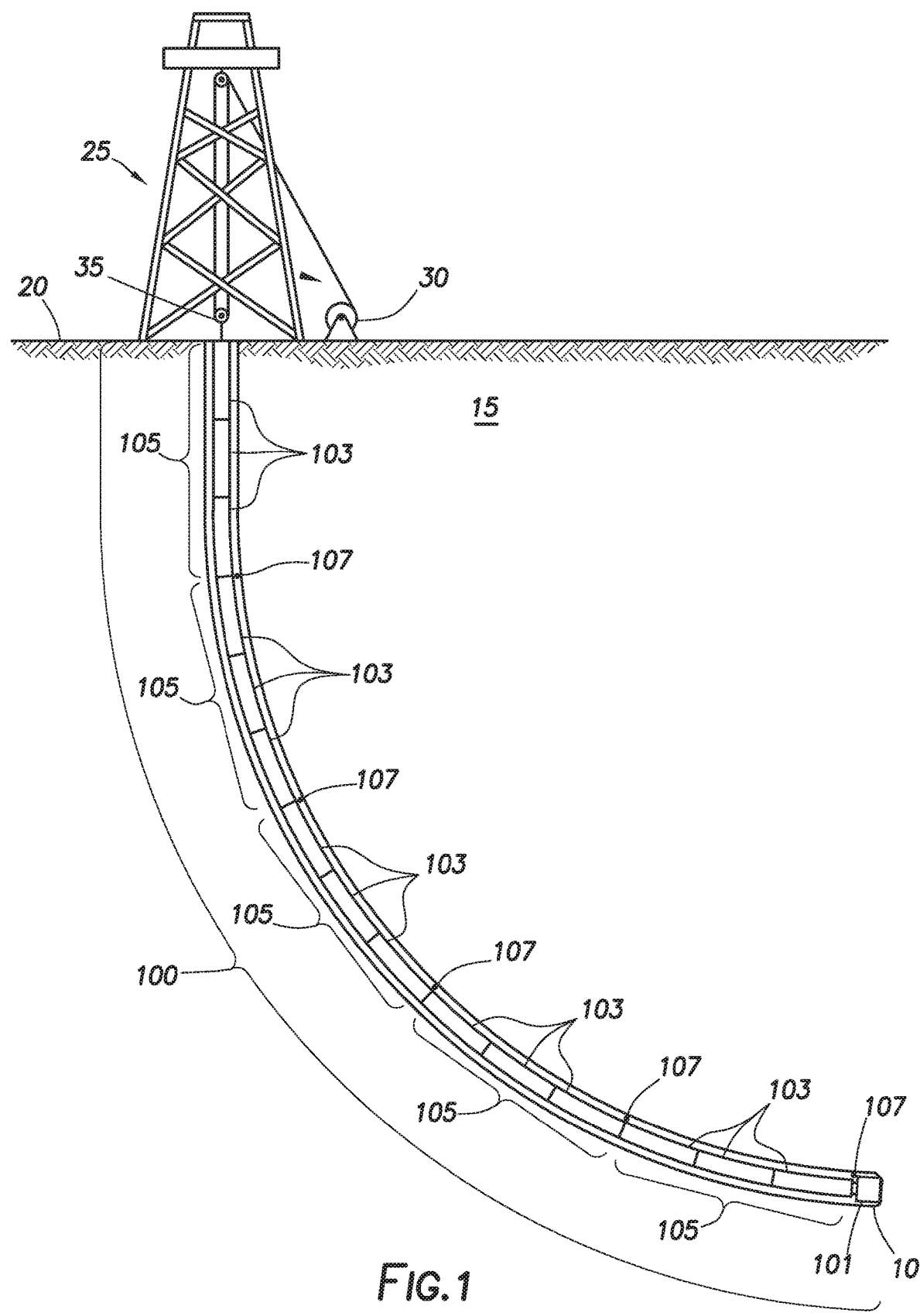
FIG. 1 depicts a portion of a measurement operation consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As depicted in FIG. 1, drill string 100 may be positioned in wellbore 10. Wellbore 10 may extend into Earth 15 from surface 20. Drill string 100 may be manipulated by drilling rig 25, which may have apparatuses to rotate drill string 100 as wellbore 10 is formed in Earth 15. In certain embodiments, drilling rig 25 may be a workover rig. In some embodiments, drilling rig 25 may include hoisting apparatuses such as drawworks 30 and traveling block 35.

In some embodiments, drill string 100 may include measurement tool 101. Measurement tool 101 may be a survey tool or any measurement while drilling (MWD) or logging while drilling tool (LWD). Example LWD tools may include, but are not limited to, resistivity, porosity, natural gamma detectors, spectral gamma detectors, and borehole calipers. Example MWD tools may include sensors that measure the earth's inclination and azimuth, such as survey tools.

Measurement tool 101 may include one or more sensors such as, for example and without limitation, magnetometers, accelerometers, or gyros. Measurement tool 101 may, for example and without limitation, be used to make measurements within wellbore 10 as drill string 100 is inserted into or removed from wellbore 10. Although depicted as being at an end of drill string 100, one having ordinary skill in the art with the benefit of this disclosure will understand that measurement tool 101 may be positioned at any point along drill string 100 without deviating from the scope of this disclosure.

As understood in the art, drill string 100 may be formed from a plurality of tubular segments 103 joined end to end. In some embodiments, tubular segments 103 may be sequentially added to drill string 100 as wellbore 10 is drilled or as drill string 100 is made up into wellbore 10. In some embodiments, drill string 100 may thus be made up by lowering drill string 100 into wellbore 10 and adding one or more tubular segments 103 to drill string 100 with drilling rig 25. The lowering and adding operations may be repeated until drill string 100 has extended a desired length into wellbore 10. In some embodiments, a first preselected number of previously joined tubular segments 103, depicted in FIG. 1 as pipe stands 105 including three tubular segments 103, may be added to drill string 100 at each step. Pipe stands 105 may be made up prior to forming drill string 100. The first preselected number of tubular segments 103 may be any number, two or more, of tubular segments 103 capable of being handled by drilling rig 25 as understood in the art.

Figure 2:
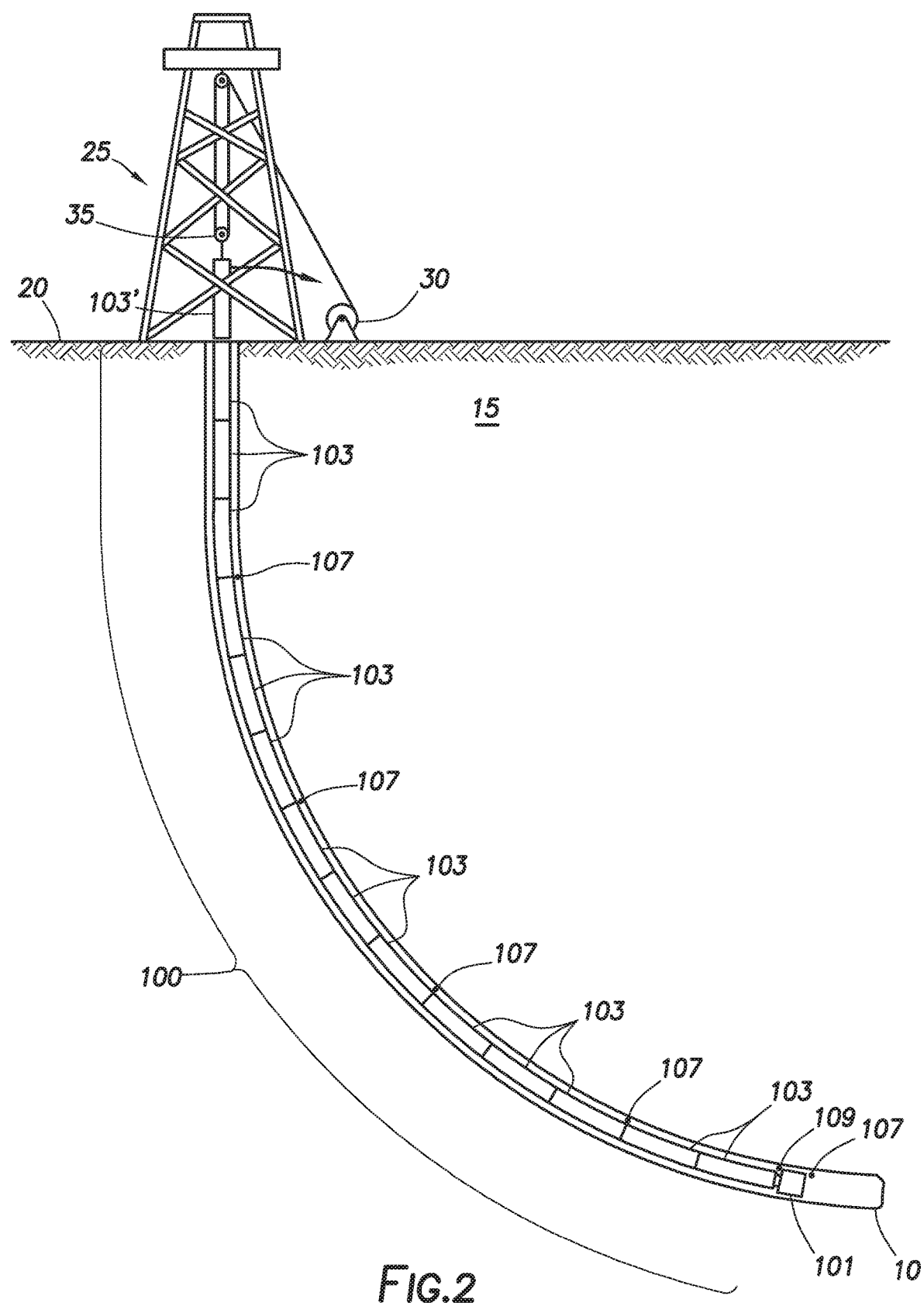
FIG. 2 depicts a portion of a measurement operation consistent with at least one embodiment of the present disclosure.
Figure 3:
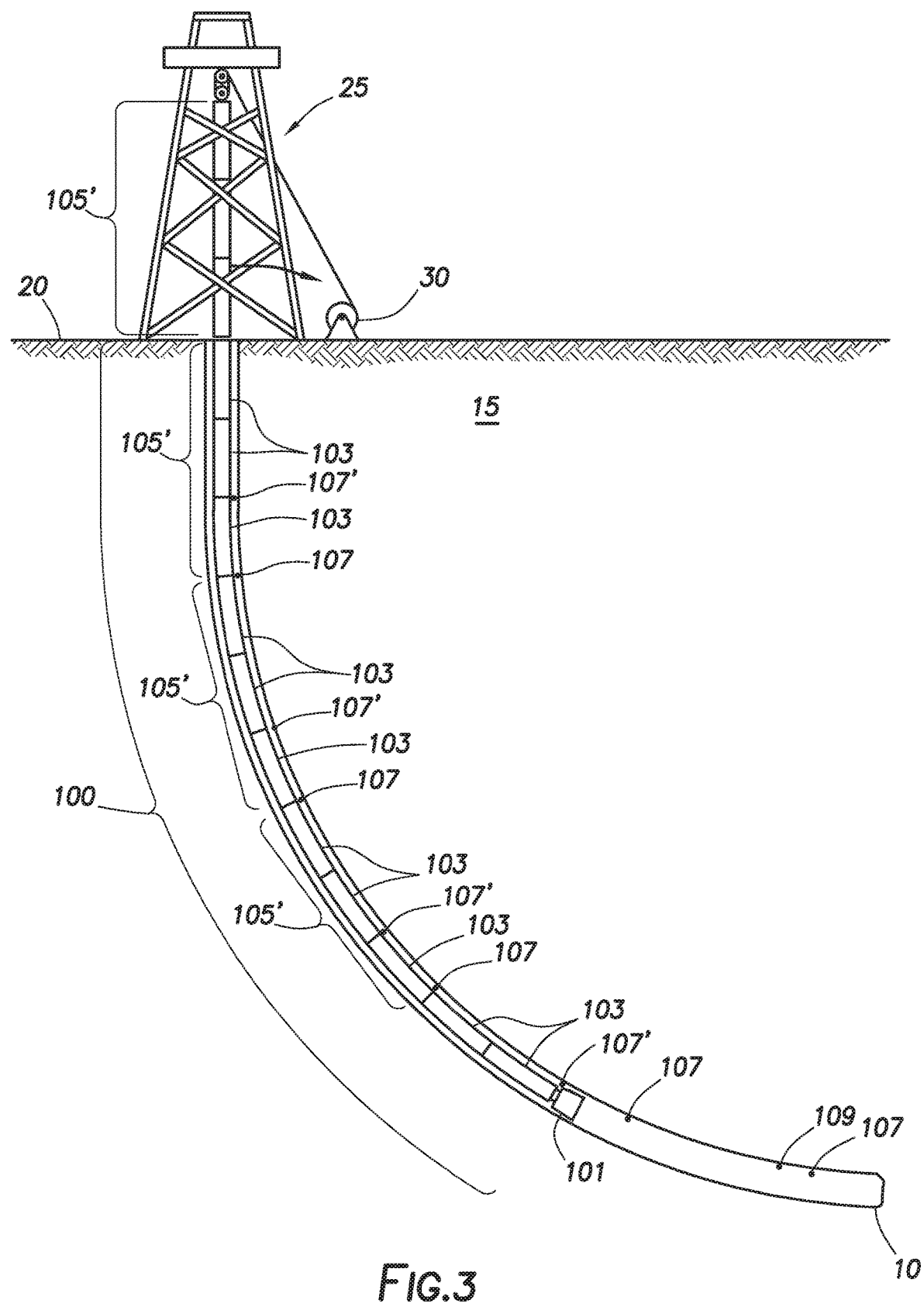
FIG. 3 depicts a portion of a measurement operation consistent with at least one embodiment of the present disclosure.

In some embodiments, as drill string 100 is tripped or lowered into the wellbore 10 or as the wellbore 10 advances due to the drilling process, measurement tool 101 may be used to take a measurement of wellbore 10 during the time in which drill string 100 is stopped as the next pipe stand 105 is added. Measurements may thus be taken at a first set of measurement locations 107 as depicted in FIGS. 1-3 as drill string 100 is inserted into wellbore 10. Thus, for example and without limitation, in an embodiment in which pipe stands 105 consist of multiples of three tubular segments 103, measurement locations 107 may be evenly spaced in wellbore 10 at a distance corresponding to the length of three tubular segments 103.

In some embodiments, drill string 100 may be tripped out of wellbore 10 by raising drill string 100 by drilling rig 25 and removing one or more tubular segments 103 from drill string 100 at drilling rig 25. In some embodiments, during the tripping out operation, a second preselected number of tubular segments 103 may be removed from drill string 100 different from the first preselected number of tubular segments 103 which were added to make up drill string 100. The second preselected number of tubular segments 103 may be any number of tubular segments 103 which is different from the first preselected number of tubular segments 103. For example and without limitation, as depicted in FIG. 2, a single tubular segment 103' may be removed from drill string 100. Subsequently, a measurement may be taken with measurement tool 101 at modified measurement location 109. In other embodiments, as understood in the art, two tubular segments 103 may be removed without deviating from the scope of this disclosure in a case where pipe stands 105 are three tubular segments 103 in length.

Drill string 100 may then be tripped out of wellbore 10 by raising drill string 100 by drilling rig 25 and removing tubular segments 103 as pipe stands 105' having the first preselected number of tubular segments 103 as depicted in FIG. 3. Measurement tool 101 may be used to take a measurement of wellbore 10 during the time in which each pipe stand 105' is removed from drill string 100. Measurements may thus be taken at a second set of measurement locations 107' as depicted in FIG. 3. Measurement locations 107' may thus be evenly spaced in wellbore 10 at a distance corresponding to the length of pipe stand 105'. Measurement locations 107' may thus be offset from measurement locations 107 by the length of the second preselected number of tubular segments 103' removed from drill string 100. In an embodiment in which one tubular segment 103' is removed as depicted in FIG. 2, measurement locations 107' may be offset from measurement locations 107 by the length of one tubular segment 103'. Thus, this method may be utilized to increase measurement density along the length of a wellbore.

Measurements taken by measurement tool 101 at measurement locations 107 and measurement locations 107' may be utilized to generate a model of wellbore 10. Measurements taken by measurement tool 101 at measurement locations 107 and 107' may be combined with other measurement or LWD information measured during drilling, such as continuous inclination and azimuth surveys, to generate a model of wellbore 10.

In some embodiments, instead of removing a second preselected number of tubular segments 103', the second preselected number of tubular segments 103' may be added prior to the tripping out operation. In some embodiments, the second preselected number of tubular segments 103' may be added or removed from drill string 100 before a tripping in operation. Although described as a tripping out and tripping in operation, one having ordinary skill in the art with the benefit of this disclosure will understand that the measurement operations described herein may be applied to a tripping in and tripping out operation without deviating from the scope of this disclosure. One having ordinary skill in the art with the benefit of this disclosure will understand that one need not measure during a trip in before measurement during a tripping out operation.

In some embodiments, a third preselected number of tubular segments 103 may be added to or removed from drill string 100 before a tripping in operation as described with respect to FIG. 1 subsequent to the tripping out operation described with respect to FIG. 3. In such an embodiment, for example and without limitation, the first preselected number of tubular segments 103 used to form pipe stands 105 may be three, the second preselected number of tubular segments 103 added to or removed from drill string 100 may be one, and the third number of tubular segments 103 added to or removed from drill string 100 before the next trip in may be one or two. In an example in which each tubular segment 103 is 30 feet long, the first tripping in operation may result in measurement locations 107 being taken 90 feet apart, the tripping out operation may result in measurement locations 107' being spaced 90 feet apart, offset 30 feet from measurement locations 107, and the subsequent tripping in operation (not shown), may result in measurement locations being spaced 90 feet apart, offset 30 feet from measurement locations 107 and 107'.

By taking measurements as discussed herein, measurements may be taken at more measurement locations 107, 107' and 109 along wellbore 10 than if taken only at the first preselected length of pipe stand 105. By increasing the number of measurement locations 107, 107', the data density of the measurements taken along wellbore 10, i.e. the number of measurements taken per length of wellbore 10, may be increased. The additional data density may, for example and without limitation, reduce error introduced when applying a curve-fitting algorithm or mathematical models such as minimum curvature or spline fits to determine the spatial model of wellbore 10 from the measurement points.

In some embodiments, additional measurement tools (not shown) may be positioned on drill string 100. In some such embodiments, the additional measurement tools may be positioned spaced apart from measurement tool 101 a distance other than the first predetermined length of pipe stand 105 or the second predetermined length of tubular segment 103'. In some such embodiments, the additional measurement tools may provide additional measurement locations along wellbore 10 other than measurement locations 107, 107', thus further increasing the data density gathered as discussed herein above. As described above, the measurement information may be utilized to generate a model of a wellbore 10.

In some embodiments, measurements taken during the surveys may be stored to internal memory positioned in measurement tool 101. In some embodiments, measurements taken during the measurement operations may be transmitted to a receiver (not shown) at surface 20. In some such embodiments, measurements taken during the measurement operations may be transmitted by any suitable method known in the art including, for example and without limitation, by wireline, MWD telemetry, electromagnetic telemetry, or mud pulse telemetry.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method for measuring a wellbore, the method comprising:
   (a) providing a drill string, a measurement tool coupled to the drill string, and a plurality of pipe stands, each pipe stand forming part of the drillstring or configured to be added to the drill string, wherein each pipe stand comprises a first number of tubular segments, and wherein the pipe stands have a pipe stand length;
   (b) obtaining a first set of measurements from the measurement tool using a first acquisition method along the wellbore at a first set of first measurement locations that are spaced along the wellbore, wherein the first measurement locations are separated by the pipe stand length, the first acquisition method comprising obtaining the first set of measurements:
   i. during drilling as each pipe stand is added to the drill string;
   ii. when tripping into the wellbore as each pipe stand is added to the drill string; or
   iii. when tripping out of a wellbore as each pipe stand is removed from the drill string;
   (c) following step (b), adding or removing a second number of tubular segments from the drill string, wherein the second number of tubular segments is less than the first number of tubular segments; and
   (d) following step (c), obtaining a second set of measurements from the measurement tool using a second acquisition method along the wellbore at a second set of second measurement locations that are spaced along the wellbore, wherein the second measurement locations are separated by the pipe stand length, the second acquisition method comprising obtaining the second set of measurements when:
   iv. tripping into the wellbore as each pipe stand is added to the drill string; or v. tripping out of a wellbore as each pipe stand is removed from the drill string;

wherein the second set of measurements is obtained during a tripping operation that is separate from the drilling or tripping operation during which the first set of measurements is obtained.

2. The method according to claim 1 wherein the pipe stand consists of between two and four tubular segments.

3. The method according to claim 1 wherein the first set of measurements and the second set of measurements are made with the measurement tool that is a survey tool, a measurement while drilling (MWD) tool or a logging while drilling tool (LWD).

4. The method according to claim 3, wherein the LWD tool is a resistivity tool, porosity tool, natural gamma detector, spectral gamma detector, or borehole calipers.

5. The method according to claim 3, wherein the MWD tool includes sensors that measure the inclination/or azimuth of the wellbore.

6. The method according to claim 3, wherein the measurement tool includes magnetometers, accelerometers, or gyros, and wherein the magnetometers, accelerometers, or gyros are used to obtain the first and second sets of measurements.

7. The method according to claim 6 wherein obtaining the first and second sets of measurements comprise determining orientation and position of the tool with respect to Earth by taking a gyrocompass or magnetic survey measurement.

8. The method according to claim 1, further including a step of transmitting the measurements to a surface of Earth using a method selected from the group consisting of wireline, MWD telemetry, electromagnetic telemetry, and mud pulse telemetry.

9. The method of claim 1, wherein the first acquisition method comprises obtaining the first of measurements during drilling and the second acquisition method comprises obtaining the second set of measurements when tripping out of a wellbore.

10. The method of claim 1, wherein the first set of measurements and the second set of measurements are stored in a memory of the measurement tool.

11. The method of claim 1, wherein each pipe stand comprises three tubular segments.

12. The method of claim 1, wherein each measurement of the first and second sets of measurements is performed when the drill string is stopped.

13. The method of claim 12, wherein each measurement of the first and second sets of measurements is performed when a stand of pipe is added or removed.

14. The method of claim 1, wherein in step (c), one or two tubular segments are added or removed from the drill string.

15. The method of claim 1, wherein in step (d) the second acquisition method is different from first acquisition method.

16. The method of claim 1, wherein the first acquisition method comprises obtaining the first of measurements while tripping out of the wellbore and the second acquisition method comprises obtaining the second set of measurements while tripping into a wellbore.

* * * * *